March 3, 1931.   C. W. THOMPSON   1,794,807

CASING FOR HYDRAULIC SHOCK ABSORBERS

Original Filed Aug. 16, 1929

INVENTOR
CLARANCE W. THOMPSON
BY *Dodson & Roe*
ATTORNEYS

Patented Mar. 3, 1931

1,794,807

UNITED STATES PATENT OFFICE

CLARANCE W. THOMPSON, OF WILMINGTON, DELAWARE

CASING FOR HYDRAULIC SHOCK ABSORBERS

Application filed August 16, 1929, Serial No. 386,261. Renewed January 7, 1931.

My invention relates to that class of shock absorbers described in my co-pending application, Serial No. 302,503, filed August 28, 1928, and has for its object to cheapen the construction of such devices.

In that type of shock absorber, a plurality of ports, of varying length, is formed in the side walls of the cylinder in which the oil is contained. It is quite expensive to machine these ports, consequently I provide for the insertion of a separate sleeve inside of the cylinder, the ports being milled in this sleeve. This, however, while reducing the expense of machining the ports, is an added expense for material.

Attempts have been made to form these ports by extruding them from the wall of the cylinder, but the expense of this has been prohibitive, owing to the necessity of providing for a collapsible mandrel which would extrude the metal in the desired shape and location.

My invention has for its principal object, to provide a method of manufacturing these cylinders so that they can be stamped; and to accomplish that result at a minimum of expense.

My means for accomplishing the foregoing objects may be more readily understood by reference to the accompanying drawings, which are hereunto annexed and made a part of this specification, in which—

Similar reference numerals refer to similar parts throughout the entire description.

Figure 1:
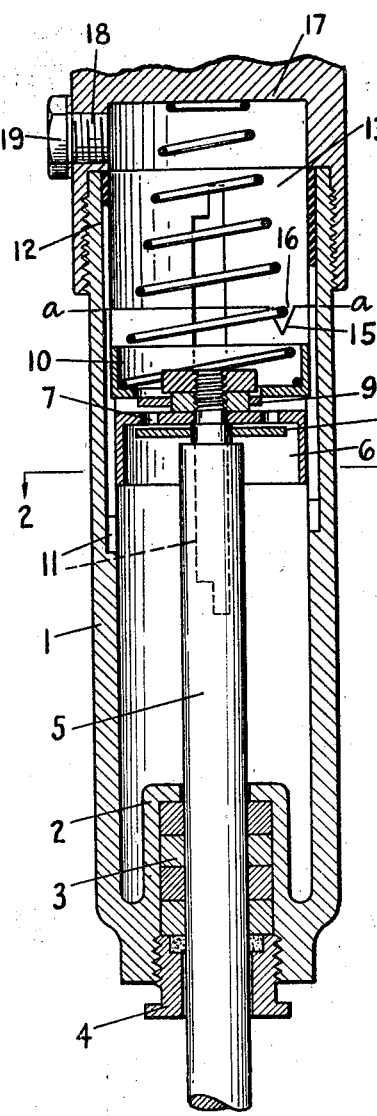
Fig. 1 is a vertical longitudinal section through a shock absorber in which the cylinder is formed in accordance with my invention.

As shown in the drawings, the shock absorber comprises a cylindrical casing 1, which is provided with a stuffing-box 2 at its lower end, the casing 1 and stuffing-box 2 being formed integrally, if desired. In the stuffing-box 2 is mounted suitable packing 3, a gland 4, of standard construction, being provided to insure a tight joint between the packing 3 and a piston rod 5 which is mounted and slidable therein. This piston rod 5 carries a piston 6, the head of which is provided with a plurality of ports 7. These ports 7 are closed, or partially closed, by means of a bottom valve member 8, which is mounted below the head of the piston 6 and is slidable upon a reduced portion of the piston rod 5. An intermediate valve member 9, mounted on the top of the head of the piston 6, operates to close, or partially close, the ports 7 in the head of the piston 6. A top valve member 10, mounted in the upper part of the cylinder 1, contacts the piston 6 on its upward movement, and operates to close such portions of said ports 7 as are not covered by the intermediate valve member 9, on the continued upward movement of the piston 6.

A plurality of wall ports 11 is formed in the side walls of the cylinder 1. These ports 11 are of varying length, so that the continued movement of the piston 6 in its upward direction will obviously cut off these ports 11 one by one. It will be obvious, to persons skilled in the art, that as these ports 11 are greater in diameter than the piston 6, it would be impossible to stamp them in the wall of the cylinder 1 and withdraw the punch or die through the reduced passage in which the piston 6 would travel after it has passed the wall ports 11 and they are all cut off.

Figure 2:
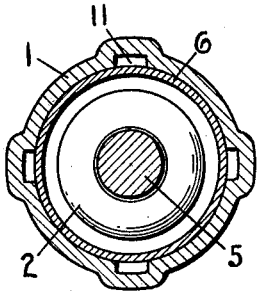
Fig. 2 is a cross-section, taken on line 2—2 in Fig. 1.

I overcome this difficulty by providing a cylinder 1 in which the upper portion is sufficiently large in its internal diameter to permit the entrance of a punch or die to form the wall ports 11, as clearly shown in Fig. 2. The punch freely enters the enlarged portion at the top of the cylinder 1, to the point indicated by the line a—a in Fig. 1, when it begins to extrude the wall of the cylinder 1 to form the wall ports 11, as clearly shown in Fig. 2. When this operation is complete, obviously the enlarged portion of the cylinder 1 will permit the withdrawal of the punch without any difficulty.

Figure 3:
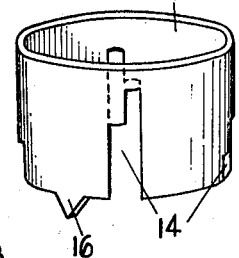
Fig. 3 is a detail view of the upper inside skirt or bushing.

In this enlarged portion 12 at the top of the cylinder 1, I mount a top inside skirt or bushing 13, as shown in Fig. 3. This skirt or bushing 13 has cut or formed therein a plurality of ports 14 of varying length, corresponding in size, shape and number, to the ports 11 in the wall of the cylinder 1. A V-shaped recess 15 is provided in the wall of the cylinder 1, to receive a V-shaped projection 16 formed on the skirt or bushing 13, so as to insure the ports 14 in the skirt or bushing 13 registering with the ports 11 extruded from the wall of the cylinder 1. A cap 17 is then screwed on threads cut on the external wall of the cylinder 1, and this serves to force the skirt or bushing 13 tightly into position in the cylinder 1 and to hold it securely in place. For the purpose of filling the cylinder 1 with oil, a threaded aperture 18 is formed in the cap 17, and a plug 19 is provided to close said aperture 18.

Figure 4:
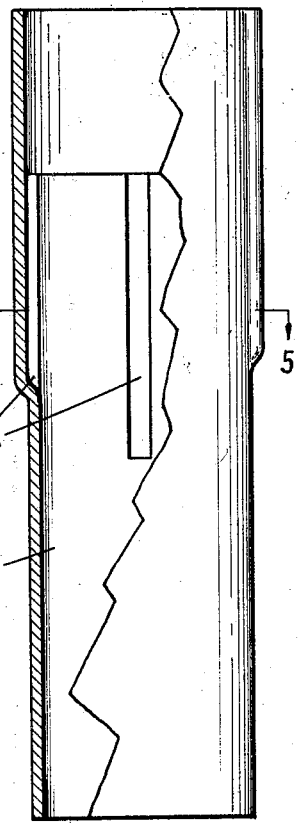
Fig. 4 is a modified form of cylinder.
Figure 5:
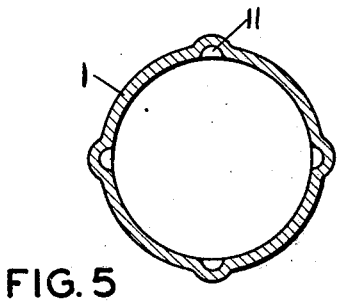
Fig. 5 is a cross-section taken on line 5—5 in Fig. 4.

In the modified form of construction shown in Figs. 4 and 5, I use a piece of tubing for a cylinder, and provide for caps both at the top and the bottom; otherwise, the construction of the cylinder is the same.

It will be apparent, to persons skilled in the art, that by this construction I have made it possible to stamp these cylinders in large quantities at a very nominal expense; and it will also be seen that the skirts or bushings can be cut from standard tubing and will be very inexpensive to manufacture. These features are of vital importance at the present time when the cost of labor is so high.

For the purpose of full disclosure of my invention I have described in some detail a specific embodiment thereof; but it will be apparent that numerous changes might be made in the physical embodiment of my invention within the scope of the claims, and I do not desire, therefore, to be understood as limiting myself, in the broader aspect of my invention, to the specific construction shown and described.

Having described my invention, what I regard as new, and desire to secure by Letters Patent of the United States, is:

1. A casing for hydraulic shock absorbers of the type described, comprising a cylinder, the upper internal portion of which is of enlarged diameter, there being longitudinal side wall ports of varying length extruded from that portion of the interior of said cylinder adjacent its enlarged end, a bushing fitted in the enlarged end of said cylinder, having ports adapted to register with the extruded wall ports of said cylinder, and a cap which closes the enlarged end of said cylinder and holds said bushing in position, there being a threaded aperture in said cap and a plug to close said aperture.

2. A casing for hydraulic shock absorbers of the type described, comprising a cylinder, the upper internal portion of which is of enlarged diameter, there being longitudinal side wall ports of varying length extruded from that portion of the interior of said cylinder adjacent its enlarged end, a bushing fitted in the enlarged end of said cylinder, having ports adapted to register with the extruded wall ports of said cylinder, means to cause the ports in said bushing to register with the wall ports in said cylinder, and a cap which closes the enlarged end of said cylinder and holds said bushing in position.

3. A casing for hydraulic shock absorbers of the type described, comprising a cylinder, the upper internal portion of which is of enlarged diameter, there being longitudinal side wall ports of varying length extruded from that portion of the interior of said cylinder adjacent its enlarged end, a stuffing-box formed in the other end of said cylinder, a bushing fitted in the enlarged end of said cylinder, having ports adapted to register with the extruded wall ports of said cylinder, and a cap which closes the enlarged end of said cylinder and holds said bushing in position.

4. A casing for hydraulic shock absorbers of the type described, comprising a cylinder, the upper internal portion of which is of enlarged diameter, there being longitudinal side wall ports of varying length extruded from that portion of the interior of said cylinder adjacent its enlarged end, a bushing fitted in the enlarged end of said cylinder, having ports adapted to register with the extruded wall ports of said cylinder, there being a V-shaped recess in the wall of said cylinder and a V-shaped projection on said bushing fitted thereto, and a cap which closes the enlarged end of said cylinder and holds said bushing in position.

5. A casing for hydraulic shock absorbers of the type described, comprising a cylinder, having at one end a stuffing-box formed integrally therewith, the internal portion of the other end of said cylinder being of enlarged diameter, there being longitudinal side wall ports of varying length extruded from that portion of the interior of said cylinder adjacent its enlarged end, a bushing fitted in the enlarged end of said cylinder, having ports adapted to register with the extruded wall ports of the cylinder, and a cap which closes the enlarged end of said cylinder and holds said bushing in position.

6. A casing for hydraulic shock absorbers of the type described, comprising a cylinder, the internal portion of one end of which is of enlarged diameter, a cap to close the other end of said cylinder, there being in said cylinder longitudinal side wall ports of varying length extruded from that portion of the interior of said cylinder adjacent its enlarged end, a bushing fitted in the enlarged end of said cylinder, having ports adapted to register with the extruded wall ports of said cylinder, means to cause the ports in said bushing to register with the wall ports in said cylinder, and a cap which closes the enlarged end of said cylinder and holds said bushing in position.

7. In a shock absorber of the type described, a cylinder, the upper internal portion of which is of enlarged diameter, there being longitudinal side wall ports of varying length extruded from that portion of the interior of said cylinder adjacent its enlarged end, and a bushing fitted to the enlarged end of said cylinder, having ports adapted to register with the extruded wall ports of said cylinder.

CLARANCE W. THOMPSON.